United States Patent
Konrad et al.

(10) Patent No.: US 12,546,460 B2
(45) Date of Patent: Feb. 10, 2026

(54) LINEAR LIGHT ENGINE EXCHANGE

(71) Applicant: LEDVANCE GmbH, Garching bei München (DE)

(72) Inventors: Armin Konrad, Großaitingen (DE); Shijun Nie, Garching (DE); Zhian Li, Shenzhen Guangdong (CN); Minghui Wang, Shenzhen (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 18/677,214

(22) Filed: May 29, 2024

(65) Prior Publication Data

US 2024/0418350 A1  Dec. 19, 2024

(30) Foreign Application Priority Data

Jun. 16, 2023 (CN) .......................... 202310721521.5

(51) Int. Cl.
| | |
|---|---|
| F21V 17/00 | (2006.01) |
| F21S 4/28 | (2016.01) |
| F21V 19/00 | (2006.01) |
| F21V 23/00 | (2015.01) |
| F21Y 103/10 | (2016.01) |
| F21Y 115/10 | (2016.01) |

(52) U.S. Cl.
CPC .............. *F21V 17/002* (2013.01); *F21S 4/28* (2016.01); *F21V 19/004* (2013.01); *F21V 19/0055* (2013.01); *F21V 23/005* (2013.01); *F21Y 2103/10* (2016.08); *F21Y 2115/10* (2016.08)

(58) Field of Classification Search
CPC .. F21V 17/002; F21V 19/004; F21V 19/0055; F21V 23/005; F21V 19/04; F21S 4/28; F21Y 2103/10; F21Y 2115/10
See application file for complete search history.

(56) References Cited

U.S. PATENT DOCUMENTS

| | | | |
|---|---|---|---|
| 11,419,956 B1* | 8/2022 | Mayfield, III | F21V 23/0457 |
| 2004/0042208 A1* | 3/2004 | Wu | F21V 13/04 |
| | | | 362/329 |
| 2010/0149792 A1* | 6/2010 | Lu | F21S 8/088 |
| | | | 362/157 |
| 2010/0157593 A1* | 6/2010 | Zhou | F21V 29/75 |
| | | | 362/249.02 |
| 2017/0167665 A1* | 6/2017 | Germain | F21V 17/164 |
| 2019/0268071 A1* | 8/2019 | Lydecker | H04B 10/116 |

* cited by examiner

*Primary Examiner* — Evan P Dzierzynski
(74) *Attorney, Agent, or Firm* — Hayes Soloway PC (57) ABSTRACT

A method for replacing a light source of a lamp is provided. The method includes providing a lamp in which a first light engine is installed, providing a light engine module with a second light engine, and removing the first light engine from the lamp. The method further includes installing the light engine module in the lamp to replace the first light engine. The light engine module includes a reinforcement for mechanically stabilizing the second light engine. The installation of the light engine module includes installing both the second light engine and reinforcement in the lamp. In addition, a first light engine, a light engine module and a lamp are also provided.

22 Claims, 6 Drawing Sheets

Provide a lamp having a first light engine — 100

Provide a light engine module — 200

Remove the first light engine from the lamp — 300

Install the light engine module in the lamp — 400

FIG. 6

LINEAR LIGHT ENGINE EXCHANGE

CROSS-REFERENCE TO RELATED APPLICATION(S)

This patent application claims the benefit of and priority to German Patent Application No. 202310721521.5, filed on Jun. 16, 2023, which is herein incorporated by reference in its entirety.

FIELD OF THE DISCLOSURE

The present disclosure generally relates to the technical field of the lamps. In particular, the present disclosure relates to a method for replacing a light engine of a lamp.

BACKGROUND

In view of environmental challenges, such as the shortage of raw materials and resources, the compatibility between lamps and circular economy is becoming more and more important. For example, in the case of upgrading or repairing a lamp, end users are encouraged to replace parts or components of a lamp, such as a light engine, instead of the whole lamp. The replacement of the light engine of the lamp may require tools and special technical knowledge that end users do not have. In addition, the end user's handling of the light engine may cause the light engine to be damaged before it is installed in the lamp.

SUMMARY

The present disclosure aims to provide a cost-effective possibility for replacing a light source of a lamp and to reduce the risk of damage to the light engine.

According to a first aspect of the present disclosure, a method for replacing a light source of a lamp is provided. The method includes, providing a lamp having a first light engine, or providing at least one first light engine of the lamp. In particular, the lamp may include a main body or housing of the lamp configured for receiving at least one light engine, especially a light emitting diode (LED) light engine. The main body of the lamp may also be configured to receive other parts of the lamp, such as an electric driver or some driving components configured for driving at least one light engine.

The lamp may also include a transparent or translucent cover configured for protecting or covering the light engine installed in the lamp. The lamp can be generally any kind of lamp. In particular, the lamp can be configured as a linear lamp, a downlight, a panel light, a low-rise lamp, a moisture-proof lamp, or as a trunking system.

The method further includes providing a light engine module having a second light engine or at least one light engine module, in particular for replacing the first light engine. The method further includes removing the first light engine or at least one first light engine from the lamp and installing the light engine module or at least one light engine module in the lamp to replace the first light engine or at least one first light engine. The light engine module includes a reinforcement or bracket for mechanically stabilizing the second light engine. The operation of installing the light engine module includes installing both the second light engine and the reinforcement in the lamp. The method may include opening the cover of the lamp before removing the first light engine, and/or closing the cover of the lamp after the light engine module is installed in the lamp.

Due to the mechanical stability of the second light engine provided by the reinforcement of the light engine module, the risk of damage to the second light engine can be greatly reduced when the end user replaces with the light engine module. In addition, since the first light engine can be installed in the manufacturing process of the lamp, rather than being installed by the end user, the first light engine can be installed reliably and safely without reinforcement, such that the overall bill of materials (BOM) of the lamp and the alternative light engine modules can be reduced.

In some embodiments, the lamp includes a mounting base or a mounting platform for mounting the light source. The operation of removing the first light engine from the lamp includes removing the first light engine from the mounting base. The operation of installing the light engine module in the lamp includes installing both the second light engine and the reinforcement onto the mounting base of the lamp. The mounting base of the lamp can particularly provide support for reliable installation of the first light engine and/or the light engine module.

In some embodiments, the light engine module is provided as a linear light engine module, which is generally compatible with the first light engine or bare light source. General compatibility in the present disclosure means that the light engine module is suitable as an alternative for the first light engine. In particular, the light engine module may have substantially the same shape and dimensions as the first light engine, such that it can be easily installed in the lamp to replace the first light engine. The light engine module may further have substantially the same or enhanced optical performance as the first light engine. The optical performance can be characterized by light efficiency, color rendering and any spectral or radiation characteristics of light. Because of the same or enhanced light performance, the replacement for the first light engine with the light engine module can at least maintain or even improve the light characteristics of the lamp.

The first light engine and the second light engine can be provided as linear light engines in particular. Especially for the elongate linear light engines with a high aspect ratio, the risk of damage will increase during transport. Therefore, the reinforcement measures provided in the light engine module can greatly reduce such risk.

The operation of removing the first light engine may include releasing at least one fixing device or fixing means to fix the first light engine in the lamp. The operation of installing the light engine module may include fixing the light engine module in the lamp with at least one fixing device. In particular, the lamp may include one or more fixing devices or fixing means configured for fixing the first light engine and/or the light engine module onto the mounting base of the lamp. By means of the fixing device, the light engine can be reliably fixed in the lamp.

According to a second aspect of the present disclosure, a first light engine for installation in a lamp is provided. The first light engine includes an LED substrate on which a plurality of LEDs are mounted. The LED substrate is configured to be replaceably or detachably mounted onto the mounting base of the lamp. In the case of lamp upgrading or maintenance, the replaceable light engine can be conveniently removed and/or replaced.

The LED substrate may have a substantially flat shape and may be configured to be replaceably mounted on a substantially flat mounting base of the lamp. Due to the flat shape of LED substrate and the mounting base of lamps, the mounting base can provide reliable support and good thermal connection for the LED substrate.

The first light engine can be provided as a linear light engine, especially for installation in linear and/or planar lamps. Linear light engines are suitable as light sources for linear lamps and panel lamps, especially when some linear light engines are arranged in parallel with each other.

According to a third aspect of the present disclosure, a light engine module for replacing a first light engine installed in a lamp is provided. The light engine module includes a second light engine and a reinforcement configured for mechanically stabilizing the second light engine. The reinforcement is configured such that both the second light engine and the reinforcement can be installed in the lamp to replace the first light engine. Since the reinforcement of the light engine module provides the mechanical stability of the second light engine, the risk of damage to the second light engine can be reduced during the replacement with the light engine module.

The light engine module can be generally compatible with the first light engine. Therefore, the light engine module can be conveniently installed in the lamp to replace the first light engine without an additional removal of the second light engine from the reinforcement.

According to a fourth aspect of the present disclosure, a lamp is provided. The lamp includes a housing configured to receive the first light engine according to the second aspect of the present disclosure. The housing is further configured to receive the light engine module according to the third aspect of the present disclosure instead of the first light engine. By replacing the first light engine with the light engine module, the lamp can be conveniently upgraded or repaired.

In the following description, details are provided to describe embodiments of the specification. However, it will be apparent to a person having ordinary skills in the art that the embodiments of the present disclosure may be practiced without these details.

Some parts of the embodiments have similar components. Similar components can have the same name or similar reference numerals. The description of a component is applicable by referring to another similar component, thus avoiding redundancy without limiting the present disclosure.

DETAILED DESCRIPTION

Figure 1:
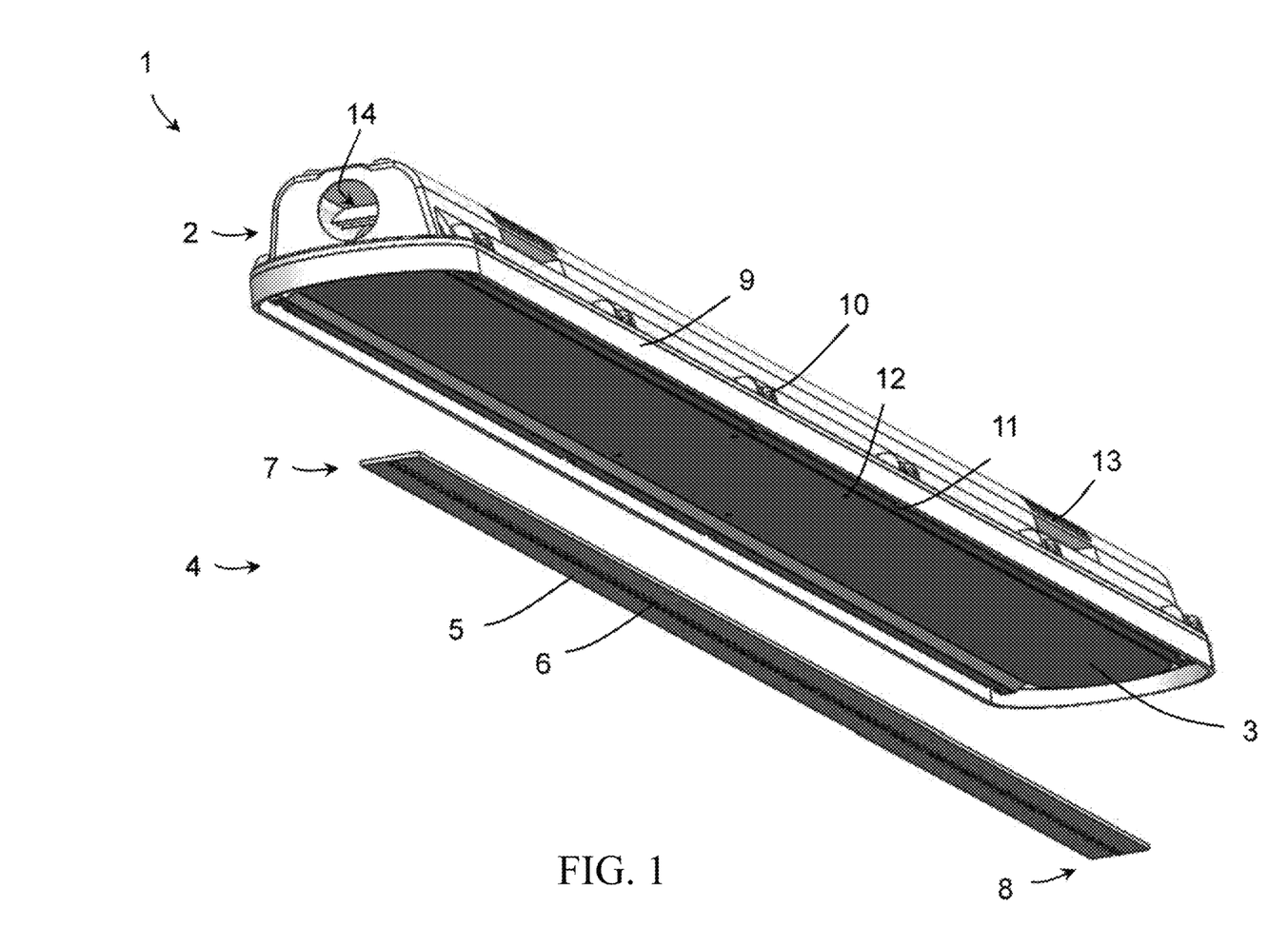
FIG. 1 depicts a perspective exploded view of a lamp according to an embodiment of the present disclosure with a first light engine according to an embodiment of the present disclosure.

FIG. 1 depicts a perspective exploded view of a lamp according to an embodiment of the present disclosure with a first light engine according to an embodiment of the present disclosure. The lamp 1 includes a housing 2 and a mounting base 3 arranged in the housing 2. FIG. 1 also shows a first light engine 4, which has an LED substrate 5 and a plurality of LEDs 6 mounted on the LED substrate 5 or a printed circuit board (PCB). The housing 2, the mounting base 3 and the LED substrate 5 of the lamp each have a long strip shape. The plurality of LEDs 6 are arranged in a row between a first longitudinal end 7 and a second longitudinal end 8 of the LED substrate 5. The first light engine 4 is configured to be mounted on the mounting base 3 of the housing 2 of the lamp, such that after the first light engine 4 is mounted, the LEDs 6 are arranged along the elongated mounting base 3 of the lamp 1. The lamp 1 can further include an electrical element, an electrical driver or some driving elements for driving the light engine mounted on the mounting base 3. The housing 2 includes a mounting flange 9 mounted on the main body of the housing 2 through a mounting element 10. The mounting flange 9 is configured for mounting a translucent cover of the lamp 1 to cover the mounting base 3 and the light engine mounted on the mounting base 3. For clarity, the translucent cover is not shown in FIG. 1.

In the implementation as shown in FIG. 1, the lamp 1 includes a fixing element 11 for fixing the mounting base 3 in the housing 2 of the lamp. The fixing element 11 is configured as a snap connector, such that the mounting base 3 can be easily fixed in the housing 2 of the lamp 1. An opening 12 is provided in the mounting base 3 for electrical connection (not shown), for example, electrical connection between the driver and the light engine 4. The opening 12 can also be configured as a fulcrum for adjusting the position of the mounting base 3 before the fixing with the fixing element 11. The housing 2 further includes ventilation holes 13 for air circulation to cool the electronic devices of the light engine 4 and/or the driver during the operation of the lamp 1. A hole for cable 14 is provided at a longitudinal end of the housing 2 of the lamp for electrically connecting the lamp 1 with an external power supply.

In this implementation, the lamp 1 represents a so-called linear lamp. However, this principle is not limited to such lamp. In some implementations, the lamp may be configured as a panel light with one or more light engines. In particular, a panel light can include a plurality of linear light engines arranged in parallel to provide a planar illumination surface. FIG. 1 corresponds to the lamp manufacturing mode, with the first light engine 4 installed as the light source of the lamp 1.

Figure 2:
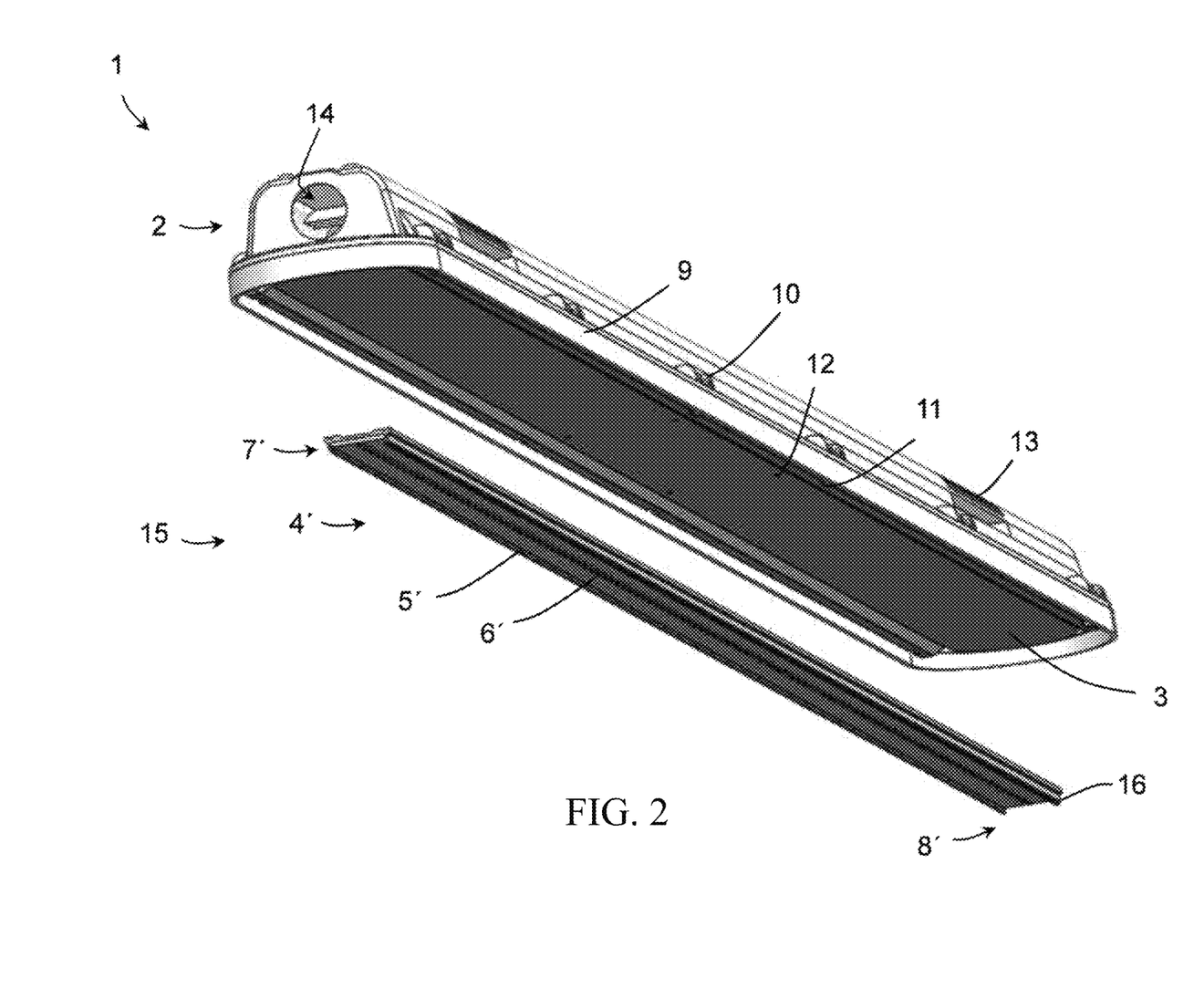
FIG. 2 depicts a perspective exploded view of the lamp of FIG. 1 with a light engine module according to an embodiment of the present disclosure.

FIG. 2 shows a perspective exploded view of the lamp of FIG. 1 with a light engine module according to an embodiment of the present disclosure. The light engine module 15 includes a second light engine 4' having an LED substrate 5' and a plurality of LEDs 6' arranged on the LED substrate 5'. The plurality of LEDs 6' are arranged in rows, extending between a first longitudinal end 7' and a second longitudinal end 8' of the LED substrate 5'. The light engine module 15 further includes a reinforcement 16 for mechanically stabilizing the second light engine 4'. The reinforcement 16 has an elongated shape and is configured to receive the second light engine 4'. Therefore, compared with the first light engine 4, the light engine module 15 with the second light engine 4' further includes a reinforcement 16 or a bracket for mechanically stabilizing the second light engine 4'.

Due to the contour of the reinforcement 16, the reinforcement can provide the necessary support and stability for the second light engine. Therefore, the risk of deformation or damage when handling the second light engine 4' during replacement can be reduced. The reinforcement 16 or the bracket of the second light engine 4' can be an aluminum profile, plastic bracket, or metal plate, which can prevent the engine from being deformed or damaged.

In the implementation as shown in FIG. 2, the light engine module 15 is basically compatible with the first light engine 4 or a bare light source. In particular, the light engine module may have substantially the same external dimensions as the first light engine, such that the module can be conveniently installed in the lamp to replace the first light engine. The light engine module may further have substantially the same or enhanced optical performance as the first light engine. In addition, in order to mount the light engine module 15 on the mounting base 3 of the lamp 1, the same mounting technology or mounting elements can be used. The optical performance can be characterized by light efficiency, color rendering and any spectral or radiation characteristics of light. Due to the same or enhanced light performance, the replacement for the first light engine with the light engine module can substantially maintain or even improve the light characteristics of the lamp. FIG. 2 corresponds to a light source replacement mode, where the light engine module 15 with the second light engine 4' and the reinforcement 16 is installed as the light source of the lamp 1.

Figure 3:
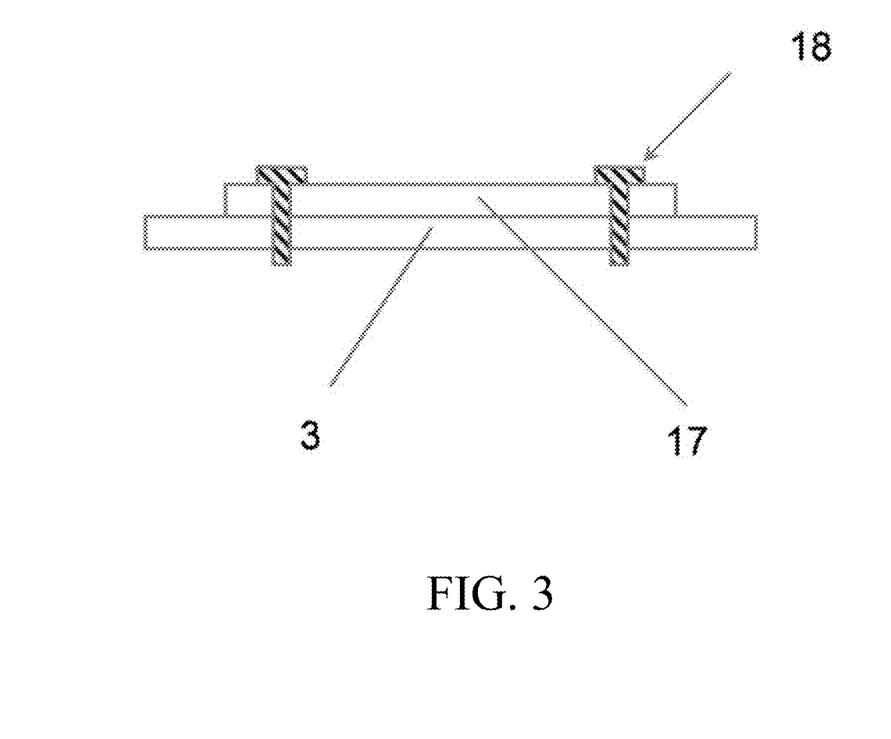
FIG. 3 depicts a schematic cross section of a light source installation according to an embodiment of the present disclosure.

FIG. 3 shows a schematic cross section view of an installation of the light source according to an embodiment of the present disclosure. The light source 17 can be the first light engine 4 as shown in FIG. 1, or the light engine module 15 (that is, the second light engine 4 together with the reinforcement 16) as shown in FIG. 2. In this embodiment, a mounting screw(s) 18 is provided as a fixing device for mounting the light source 17 on the mounting base 3 of the lamp. The light source 17 has an opening(s) or a through hole(s) for receiving the mounting screw(s) 18 which can be screwed into the corresponding threaded hole(s) in the mounting base 3 of the lamp 1. In an implementation, the LED substrate 5 of the first light engine 4 may have a through hole for receiving the mounting screw. Similarly, each of the LED substrate 5' of the second light engine 4' and the reinforcement 16 of the light engine module 15 may also have a through hole for receiving the mounting screw. The mounting screw 18 can be sized in a such way that the mounting screw 18 can be configured to mount the first light engine 4 or the light engine module 15 (i.e., the assembly of second light engine 4' together with the reinforcement 16). The first light engine 4 and/or the light engine module 15 can be firmly fixed on the mounting base 3 of the lamp by means of the mounting screw.

Figure 4:
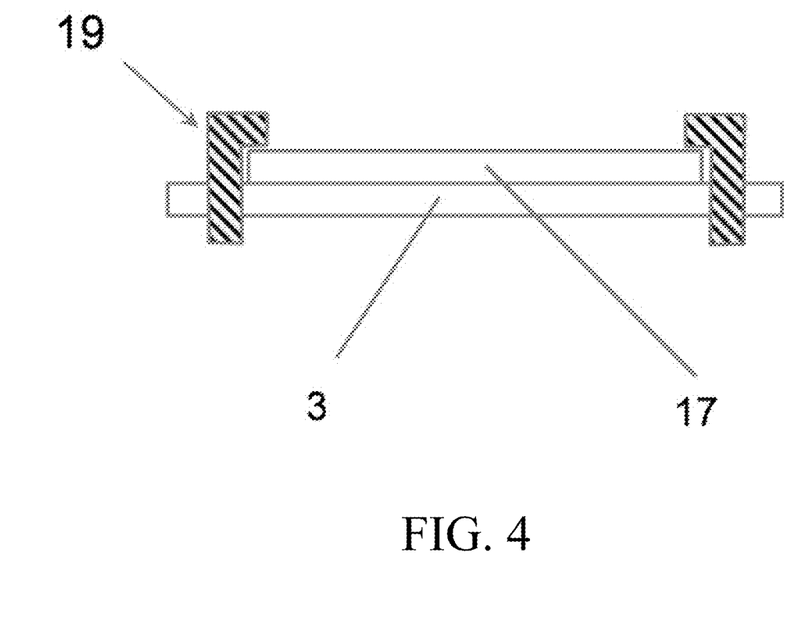
FIG. 4 depicts a schematic cross section of a light source installation according to another embodiment second of the present disclosure.

FIG. 4 shows a schematic cross section of an installation of a light source according to another embodiment of the present disclosure. In the embodiment as shown in FIG. 4, a mounting clip 19 is configured to mount the light source 17 onto the mounting base 3 of the lamp 1. The mounting clip 19 can be sized in a such way that the mounting clip 19 can be configured to mount the first light engine 4 or the light engine module 15 (i.e., the assembly of the second light engine 4' and the reinforcement 16). The first light engine 4 can be conveniently and quickly replaced with the light engine module 15 by means of the installing clip 19.

Figure 5:
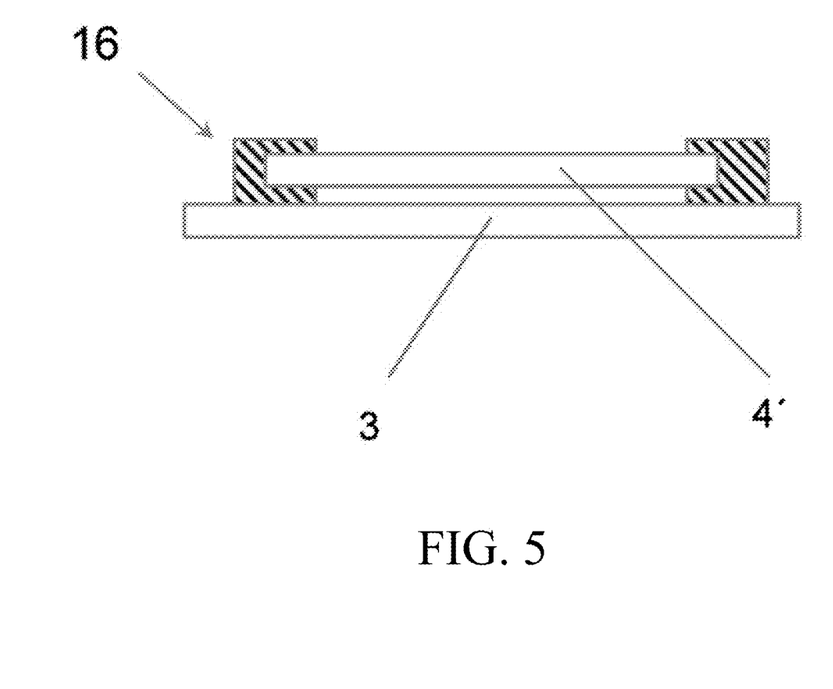
FIG. 5 depicts a schematic cross section of a light source installation according to yet another embodiment of the present disclosure.

FIG. 5 shows a schematic cross section of an installation of a light source according to yet another embodiment of the present disclosure. In the embodiment as shown in FIG. 5, the reinforcement 16 of the light engine module 15 serves as a bracket for the second light engine 4'. Therefore, the reinforcement has dual functions. One function is to mechanically stabilize the second light engine 4'. And the other function is to fix the second light engine 4' on the mounting base 3 of the lamp 1. The fixing constructions shown in FIGS. 3 to 5 can be configured to fix the bare light source (without reinforcement) or the light engine module (with reinforcement), even if the bare light source and the light engine module have different thicknesses.

In some embodiments, the reinforcement 16 has a substantially flat upper surface for receiving a substantially flat substrate of the light engine, and a substantially flat lower surface as a contact surface for mounting the reinforcement 16 on the mounting base 3. Due to the flat structure, especially the flat upper surface and the flat lower surface of the reinforcement 16, good thermal contact can be established between the second light engine 4' and the reinforcement 16 and between the reinforcement 16 and the mounting base 3.

Figure 6:
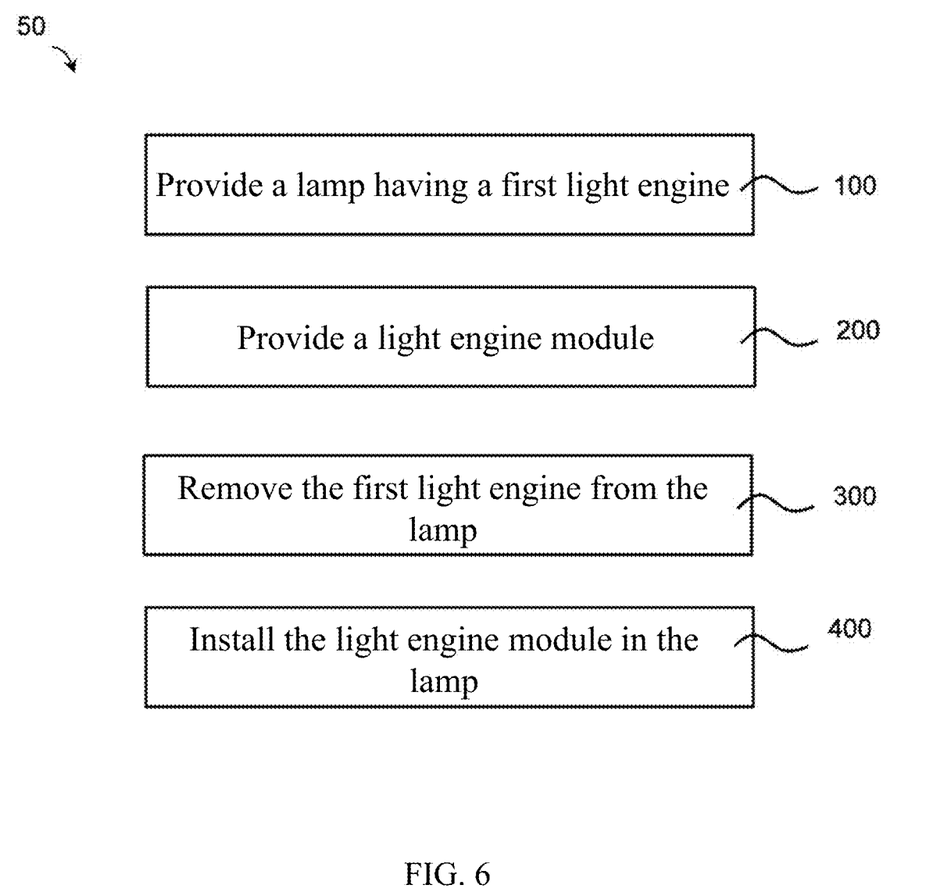
FIG. 6 depicts a flowchart of a method for replacing a light engine of a lamp according to an embodiment of the present disclosure.

FIG. 6 shows a flowchart of a method for replacing a light engine of a lamp according to an embodiment of the present disclosure. According to a method 50 for replacing a light engine in a lamp, in step 100, a lamp having at least one first light engine installed in the lamp is provided. The first light engine can be installed especially during the manufacturing process of the lamp.

In step 200, at least one light engine module with at least one second light engine is provided to replace the first light engine. The at least one first light engine and/or the at least one second light engine may include some light engines, such as linear light engines, especially those described in the above embodiments. The light engine module may include at least one reinforcement or bracket for mechanically stabilizing the second light engine.

In step 300, the first light engine is removed from the lamp. In step 400, the light engine module is installed in the lamp to replace the first light engine. The installation of the light engine module in step 400 includes the installation of the second light engine together with the reinforcement in the lamp.

In some embodiments, the lamp includes a mounting base for mounting a light source. The removal of the first light engine in step 300 may include the removal of the first light engine from the mounting base of the lamp. The installation of the light engine module in the lamp may include the installation of both the second light engine and the reinforcement on the mounting base of the lamp.

The light engine module can be compatible with the first light engine. In an implementation, the light engine module can have substantially the same shape and dimensions as the first light engine, such that the module can be conveniently installed in the lamp rather than replacing the first light engine by adopting the same installation means.

In some embodiments, the lamp includes a translucent cover of the light source. The method can include opening or removing the cover before removal of the first light engine in step 300. The method can further include closing or installing the cover on the mounting flange of the lamp after the light engine module is installed in step 400.

In particular, since a reinforcing or fixing device is provided in the light engine module instead of the first light engine, the light source can be replaced in a reliable and user-friendly manner. At the same time, the overall cost, including the cost of manufacturing lamps, can be kept at a low level.

Especially for lamps with an elongate linear light engine, such as moisture proof, trunking system, low-rise lamps, panel lights or downlights, the reinforcement measures provided in the light engine module are contribute to a significant reduction in damage risk of the light engine when replacing the light source of lamps. At the same time, the reinforcement does not need to be a part of the initial product, since the initial product may have a bare light engine, for example, just a PCB with LEDs installed thereon. Therefore, the manufacturing cost of the lamp can be kept low.

Although at least one example implementation has been illustrated in the foregoing detailed description, it should be understood that numerous variations can be included. It should also be understood that the descriptive implementations or example implementations are only examples and are not intended to limit the scope, applicability or configuration of the present disclosure in any way. On the contrary, the above detailed description will provide a convenient roadmap for a person having ordinary skills in the art to realize example implementations.

LIST OF REFERENCE NUMERALS

1 Lamp
2 Housing
3 Mounting base
4, 4' Light engine
5, 5' LED substrate
6, 6' LED
7, 7' First longitudinal end
8, 8' Second longitudinal end
9 Flange
10 Mounting element
11 Fixing element
12 Opening
13 Ventilation hole
14 Hole for cable
15 Optical engine module
16 Reinforcement
17 Light source
18 Mounting screw
19 Mounting clip
50 Method
100 Provide a lamp with a first light engine
200 Provide a light engine module
300 Detach the first light engine from the lamp
400 Install the light engine module in the lamp

What is claimed is:

1. A method for replacing a light source of a lamp in which a first light engine is installed, the method comprising:
removing the first light engine from the lamp by dismounting a light emitting-diode (LED)-populated substrate of the first light engine from a mounting base arranged within a housing of the lamp; and
installing a light engine module in the lamp to replace the first light engine, wherein:
the light engine module comprises:
a second light engine; and
a reinforcement configured for mechanically stabilizing the second light engine; and
installing the light engine module in the lamp comprises mounting an LED-populated substrate of the second light engine and the reinforcement onto the mounting base arranged within the housing of the lamp.

2. The method according to claim 1, wherein the light engine module is substantially compatible with the first light engine.

3. The method according to claim 1, wherein at least one of the first light engine and the second light engine is configured as a linear light engine.

4. The method according to claim 1, wherein removing the first light engine comprises:
releasing at least one fixing device configured for fixing the first light engine in the lamp.

5. The method according to claim 4, wherein installing the light engine module in the lamp comprises:
fixing the light engine module in the lamp utilizing the at least one fixing device.

6. The method according to claim 1, wherein:
at least one of the substrate of the first light engine and the substrate of the second light engine has a substantially flat shape; and
the mounting base has a substantially flat surface.

7. The method according to claim 1, wherein the reinforcement is configured such that both the second light engine and the reinforcement are installed together in the lamp to replace the first light engine.

8. The method according to claim 1, wherein the lamp further comprises the housing, wherein the housing is configured both:
to receive the first light engine; and
to receive the light engine module instead of the first light engine.

9. The method according to claim 1, wherein the reinforcement is configured as a mounting clip configured to at least partially enclose the LED-populated substrate of the second light engine.

10. The method according to claim 1, wherein the reinforcement is configured as a generally C-shaped bracket configured to at least partially enclose the LED-populated substrate of the second light engine.

11. The method according to claim 1, wherein the reinforcement is configured to serve as a bracket for the second light engine.

12. The method according to claim 1, wherein the reinforcement is configured to interface with at least two sides of the LED-populated substrate of the second light engine.

13. The method according to claim 1, wherein the reinforcement is configured to interface with at least three sides of the LED-populated substrate of the second light engine.

14. The method according to claim 1, wherein the reinforcement is configured to at least one of:
mechanically stabilize the LED-populated substrate of the second light engine on the mounting base; and
fix the LED-populated substrate of the second light engine on the mounting base.

15. The method according to claim 1, wherein the reinforcement is configured to both:
mechanically stabilize the LED-populated substrate of the second light engine on the mounting base; and
fix the LED-populated substrate of the second light engine on the mounting base.

16. The method according to claim 1, wherein the reinforcement has at least one of:
a substantially flat lower surface configured to interface with the mounting base; and
a substantially flat upper surface configured to interface with the LED-populated substrate of the second light engine.

17. The method according to claim 1, wherein the reinforcement has both:
a substantially flat lower surface configured to interface with the mounting base; and
a substantially flat upper surface configured to interface with the LED-populated substrate of the second light engine.

18. The method according to claim 1, wherein the reinforcement is configured to prevent the LED-populated substrate of the second light engine from being deformed or damaged while installing the light engine module in the lamp.

19. The method according to claim 1, wherein the first light engine and the light engine module are dissimilar in that the first light engine is devoid of a reinforcement like that of the light engine module.

20. The method according to claim 1, wherein the LED-populated substrate of the second light engine comprises a printed circuit board.

21. The method according to claim 1, wherein the LED-populated substrate of the second light engine is configured to be replaceably or detachably mounted onto the mounting base arranged within the housing of the lamp.

22. The method according to claim 1, wherein the lamp is configured as a linear lamp, a downlight, a panel light, a low-rise lamp, a moisture-proof lamp, or a trunking system.

* * * * *